United States Patent
Lee et al.

(10) Patent No.: US 11,489,370 B2
(45) Date of Patent: Nov. 1, 2022

(54) WIRELESS POWER TRANSCEIVER, AND IMAGE DISPLAY APPARATUS INCLUDING THE SAME

(71) Applicant: LG ELECTRONICS INC., Seoul (KR)

(72) Inventors: Hyeongsoo Lee, Seoul (KR); Sungwook Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/266,053

(22) PCT Filed: Aug. 9, 2019

(86) PCT No.: PCT/KR2019/010059
§ 371 (c)(1),
(2) Date: Feb. 4, 2021

(87) PCT Pub. No.: WO2020/032673
PCT Pub. Date: Feb. 13, 2020

(65) Prior Publication Data
US 2021/0296932 A1    Sep. 23, 2021

(30) Foreign Application Priority Data

Aug. 10, 2018 (KR) .................. 10-2018-0093906

(51) Int. Cl.
*H02J 50/12*    (2016.01)
*G09G 3/20*    (2006.01)
*H02J 50/00*    (2016.01)

(52) U.S. Cl.
CPC ............... *H02J 50/12* (2016.02); *G09G 3/20* (2013.01); *H02J 50/00* (2016.02); *G09G 2330/02* (2013.01)

(58) Field of Classification Search
CPC .................................. H02J 50/12; H02J 50/00
See application file for complete search history.

(56) References Cited

U.S. PATENT DOCUMENTS 6,999,857 B1    2/2006  Kasper et al.
10,651,685 B1 *   5/2020  Herbst .................. H02J 50/402
(Continued)

FOREIGN PATENT DOCUMENTS

| KR | 10-2010-0013882 A | 2/2010 |
| KR | 10-2017-0014857 A | 2/2017 |
| KR | 10-2018-0025756 A | 3/2018 |

*Primary Examiner* — Daniel Kessie
*Assistant Examiner* — Brian K Baxter
(74) *Attorney, Agent, or Firm* — Birch, Stewart, Kolasch & Birch, LLP

(57) ABSTRACT

Provided are a wireless power transceiver and an image display apparatus including the wireless power transceiver according to the present disclosure. The wireless power transceiver according to an embodiment of the present disclosure comprises a surface electromagnetic (EM) wave transmitter including a first metal layer, a second metal layer, and at least one of a dielectric material formed between the first metal layer and the second metal layer; a surface EM wave receiver including a third metal layer, a fourth metal layer, and at least one of a dielectric material formed between the third metal layer and the fourth metal layer; and a bridge metal plate disposed between the surface EM wave transmitter and the surface EM wave receiver, wherein one end of the signal output terminal is connected to a floating ground. Accordingly, wireless power may be transmitted using surface EM waves.

18 Claims, 15 Drawing Sheets

(56) References Cited

U.S. PATENT DOCUMENTS

| | | | |
|---|---|---|---|
| 11,271,611 B1* | 3/2022 | Melone | H02J 50/20 |
| 2008/0117117 A1* | 5/2008 | Washiro | H02J 50/05 |
| | | | 343/850 |
| 2010/0068995 A1 | 3/2010 | Brantner | |
| 2013/0193772 A1* | 8/2013 | Kobayashi | H02J 50/40 |
| | | | 307/104 |
| 2013/0214613 A1* | 8/2013 | Kobayashi | H02J 50/20 |
| | | | 307/104 |
| 2013/0279106 A1* | 10/2013 | Ergun | G06F 1/1607 |
| | | | 361/679.26 |
| 2014/0062215 A1* | 3/2014 | Seo | H02J 50/12 |
| | | | 307/104 |
| 2015/0022021 A1* | 1/2015 | Hattori | H02J 50/40 |
| | | | 307/104 |
| 2016/0172311 A1* | 6/2016 | Pagani | H01L 21/76224 |
| | | | 324/762.01 |
| 2017/0005529 A1* | 1/2017 | Burling | H01Q 13/26 |
| 2017/0187250 A1* | 6/2017 | Cha | H01Q 21/065 |
| 2018/0219423 A1* | 8/2018 | Maunder | G06K 19/0723 |
| 2019/0036380 A1* | 1/2019 | Garrity | H02S 40/30 |
| 2019/0214734 A1* | 7/2019 | Bien | H02J 50/005 |
| 2019/0222073 A1* | 7/2019 | Lee | H02J 50/60 |
| 2019/0237879 A1* | 8/2019 | Park | H01Q 21/065 |
| 2020/0358321 A1* | 11/2020 | Duche | H02J 50/30 |
| 2021/0200288 A1* | 7/2021 | Lee | G06F 1/26 |
| 2021/0296932 A1* | 9/2021 | Lee | G09G 3/20 |

* cited by examiner

WIRELESS POWER TRANSCEIVER, AND IMAGE DISPLAY APPARATUS INCLUDING THE SAME

CROSS REFERENCE TO RELATED APPLICATIONS

This application is the National Phase of PCT International Application No. PCT/KR2019/010059, filed on Aug. 9, 2019, which claims priority under 35 U.S.C. 119(a) to Patent Application No. 10-2018-0093906, filed in the Republic of Korea on Aug. 10, 2018, all of which are hereby expressly incorporated by reference into the present application.

BACKGROUND OF THE DISCLOSURE

1. Field of the Disclosure

The present disclosure relates to a wireless transceiver and an image display apparatus including the wireless transceiver and, more particularly, to a wireless power transceiver capable of transmitting wireless power using surface EM waves and an image display apparatus including the wireless power transceiver.

2. Description of the Related Art

Recently, research on wireless power transmission between electronic devices is being conducted.

In particular, research on various types of wireless power transmission such as capacitive and inductive types is being conducted.

Meanwhile, as a recent solution to wireless power transmission, methods using surface EM waves, which are propagated through the surface of a metal plate as a transmission medium, are being studied.

SUMMARY

An object of the present disclosure is to provide a wireless power transceiver capable of transmitting wireless power using surface EM waves and an image display apparatus including the wireless power transceiver.

Another object of the present disclosure is to provide a wireless power transceiver that may be readily implemented as a surface EM wave receiver when wireless power is transmitted through surface EM waves and an image display apparatus including the wireless power transceiver.

To achieve the objects above, a wireless power transceiver and an image display apparatus including the wireless power transceiver according to an embodiment of the present disclosure comprises a surface electromagnetic (EM) wave transmitter including a first metal layer connected electrically to a signal input terminal, a second metal layer in which a plurality of patterns are formed, and at least one of a dielectric material formed between the first metal layer and the second metal layer; a surface EM wave receiver including a third metal layer connected electrically to a signal output terminal, a fourth metal layer in which a plurality of patterns are formed, and at least one of a dielectric material formed between the third metal layer and the fourth metal layer; and a bridge metal plate disposed between the surface EM wave transmitter and the surface EM wave receiver, wherein one end of the signal output terminal is connected to a floating ground.

Meanwhile, one end of the signal input terminal is connected to the ground.

Meanwhile, the surface EM wave transmitter further includes an insulation layer contacting the second metal layer.

Meanwhile, the surface EM wave transmitter further includes an insulation layer formed between the first metal layer and the second metal layer, and the insulation layer includes ferrite material.

Meanwhile, the surface EM wave transmitter includes first to third dielectric materials disposed between the first metal layer and the second metal layer, and the surface EM wave transmitter further includes a first insulation layer disposed between the first dielectric material and the second dielectric material and a metal layer disposed between the second dielectric material and the third dielectric material.

Meanwhile, a sum of heights of the first to the third dielectric materials is larger than the height of the first metal layer or the height of the second metal layer.

Meanwhile, the spacing between a plurality of patterns within the second metal layer is smaller than the width of the patterns.

Meanwhile, based on a signal applied to the signal input terminal, electromagnetic waves are output in a direction from the first metal layer to the second metal layer.

Meanwhile, the surface EM wave receiver includes fourth to sixth dielectric materials disposed between the third metal layer and the fourth metal layer, and further includes a second insulation layer disposed between the fourth dielectric material and the fifth dielectric material and a metal layer disposed between the fifth dielectric material and the sixth dielectric material.

Meanwhile, the width at both ends of the bridge metal plate may be wider than that of the central part of the bridge metal plate.

Meanwhile, the width may increase toward both ends of the bridge metal plate.

Meanwhile, the thickness at both ends of the bridge metal plate may be larger than that of the central part of the bridge metal plate.

To achieve the objects above, a wireless power transceiver and an image display apparatus including the wireless power transceiver according to another embodiment of the present disclosure comprises a surface EM wave transmitter including a first metal layer connected electrically to a signal input terminal, a second metal layer in which a plurality of patterns are formed, and at least one of a dielectric material formed between the first metal layer and the second metal layer; a surface EM wave receiver including a third metal layer connected electrically to a signal output terminal, a fourth metal layer in which a plurality of patterns are formed, and at least one of a dielectric material formed between the third metal layer and the fourth metal layer; and a bridge metal plate disposed between the surface EM wave transmitter and the surface EM wave receiver, wherein the surface EM wave transmitter further includes an insulation layer formed between the first metal layer and the second metal layer, and the insulation layer includes ferrite material.

Advantageous Effects

A wireless power transceiver and an image display apparatus including the wireless power transceiver according to one embodiment of the present disclosure comprises a surface electromagnetic (EM) wave transmitter including a first metal layer connected electrically to a signal input terminal, a second metal layer in which a plurality of patterns are formed, and at least one of a dielectric material formed between the first metal layer and the second metal layer; a surface EM wave receiver including a third metal layer connected electrically to a signal output terminal, a fourth metal layer in which a plurality of patterns are formed, and at least one of a dielectric material formed between the third metal layer and the fourth metal layer; and a bridge metal plate disposed between the surface EM wave transmitter and the surface EM wave receiver, wherein one end of the signal output terminal is connected to a floating ground. According to the present disclosure, wireless power may be transmitted through surface EM waves. Meanwhile, the present disclosure enables a surface EM wave receiver to be readily implemented when wireless power is transmitted using surface EM waves.

Meanwhile, the surface EM wave transmitter further includes an insulation layer formed between the first metal layer and the second metal layer, and the insulation layer includes ferrite material. Accordingly, the phase of a transmitted electromagnetic wave may be adjusted.

Meanwhile, the surface EM wave transmitter includes first to third dielectric materials disposed between the first metal layer and the second metal layer, and the surface EM wave transmitter further includes a first insulation layer disposed between the first dielectric material and the second dielectric material and a metal layer disposed between the second dielectric material and the third dielectric material. Accordingly, wireless power may be transmitted using surface EM waves.

Meanwhile, a sum of heights of the first to the third dielectric materials is larger than the height of the first metal layer or the height of the second metal layer. Accordingly, wireless power may be transmitted using surface EM waves.

Meanwhile, the spacing between a plurality of patterns within the second metal layer is smaller than the width of the patterns. Accordingly, wireless power may be transmitted using surface EM waves.

Meanwhile, based on a signal applied to the signal input terminal, electromagnetic waves are output in a direction from the first metal layer to the second metal layer. Accordingly, wireless power may be transmitted using surface EM waves.

Meanwhile, the surface EM wave receiver includes fourth to sixth dielectric materials disposed between the third metal layer and the fourth metal layer, and further includes a second insulation layer disposed between the fourth dielectric material and the fifth dielectric material and a metal layer disposed between the fifth dielectric material and the sixth dielectric material. Accordingly, wireless power may be transmitted using surface EM waves.

Meanwhile, a wireless power transceiver and an image display apparatus including the wireless power transceiver according to another embodiment of the present disclosure comprises a surface EM wave transmitter including a first metal layer connected electrically to a signal input terminal, a second metal layer in which a plurality of patterns are formed, and at least one of a dielectric material formed between the first metal layer and the second metal layer; a surface EM wave receiver including a third metal layer connected electrically to a signal output terminal, a fourth metal layer in which a plurality of patterns are formed, and at least one of a dielectric material formed between the third metal layer and the fourth metal layer; and a bridge metal plate disposed between the surface EM wave transmitter and the surface EM wave receiver, wherein the surface EM wave transmitter further includes an insulation layer formed between the first metal layer and the second metal layer, and the insulation layer includes ferrite material. Accordingly, wireless power may be transmitted using surface EM waves. In particular, the phase of a transmitted electromagnetic wave may be adjusted.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Embodiments of the present disclosure will be described below in detail with reference to the attached drawings.

The terms "module" and "unit", used to signify components, are used herein to help understanding of the components, and thus, they should not be considered as having specific meanings or roles. Accordingly, the terms "module" and "unit" may be used interchangeably.

Figure 1:
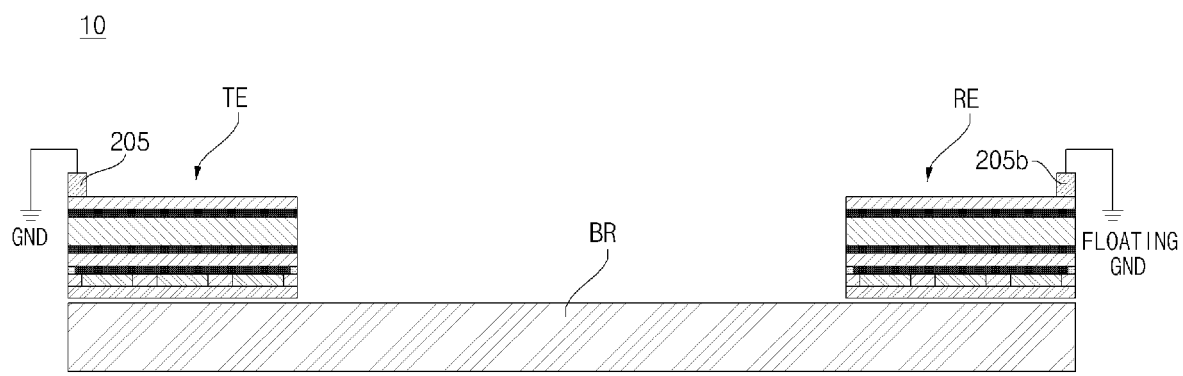
FIG. 1 illustrates a wireless power transceiver according to one embodiment of the present disclosure.

FIG. 1 illustrates a wireless power transceiver according to one embodiment of the present disclosure, and FIGS. 2 to 5b are drawings referenced in the description of FIG. 1.

First, referring to FIG. 1, a wireless power transceiver 10 according to one embodiment of the present disclosure may comprise a surface EM wave transmitter TE including a first metal layer 210 connected electrically to a signal input terminal 205, a second metal layer 220 in which a plurality of patterns 222 are formed, and at least one of a dielectric material formed between the first metal layer 210 and the second metal layer 220; a surface EM wave receiver RE including a third metal layer 210b connected electrically to a signal output terminal; a fourth metal layer 220b in which a plurality of patterns 222b are formed; and at least one of a dielectric material formed between the third metal layer 210b and the fourth metal layer 220b; and a bridge metal plate BR disposed between the surface EM wave transmitter TE and the surface EM wave receiver RE.

The TE may transmit surface EM waves through the BR, and the RE may receive surface EM waves through the BR.

The principle of surface EM wave transmission may be based on the Evanescent mode in the second metal layer 220 in which a plurality of patterns 222 are formed.

Meanwhile, the RE has to be connected to the ground to receive incoming surface EM waves; however, since the signal output terminal 225b is disposed at a position significantly high above the ground, inconvenience is caused.

In this regard, the present disclosure is implemented so that one end of the signal output terminal 225b is connected to the floating ground. Therefore, circuit stability of the RE may be achieved.

Meanwhile, in the figure, it is illustrated that one end of the signal input terminal 205 is connected to the ground (GND), in particular, the earth ground.

In the present disclosure, grounding of the signal input terminal 205 and the grounding of the signal output terminal 225b are arranged differently from each other.

Figure 2:
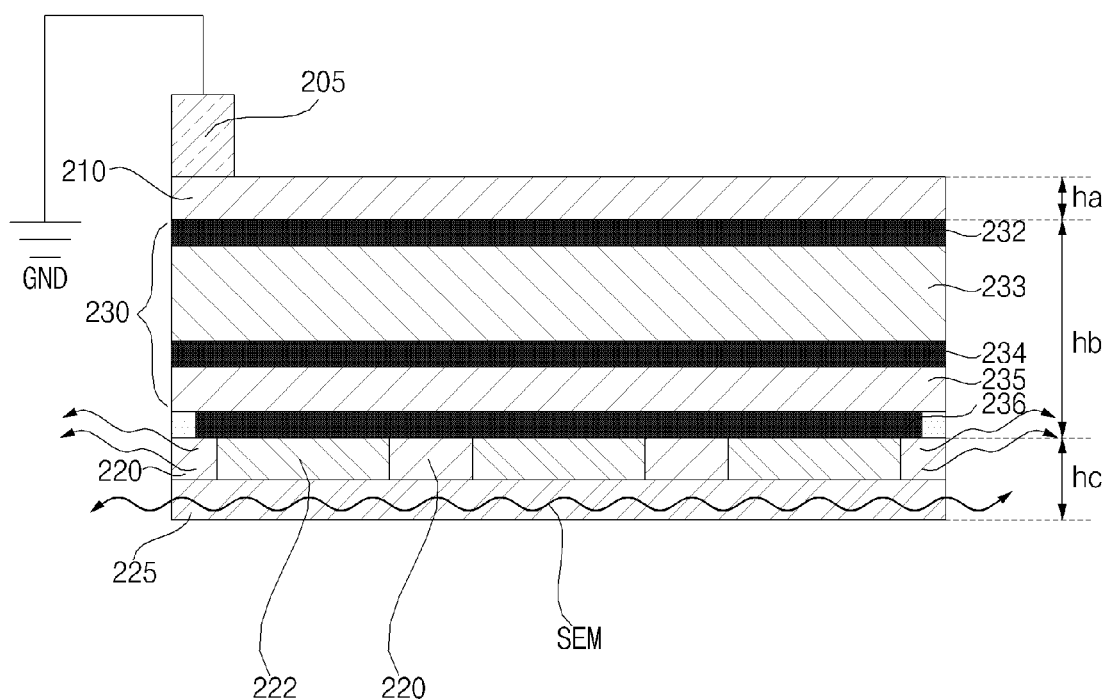
FIGS. 2 to 5b are drawings referenced in the description of FIG. 1.

FIG. 2 illustrates a surface EM wave receiver RE in detail.

Referring to the figure, the TE may include a first metal layer 210, a second metal layer 220 in which a plurality of patterns 222 are formed, and at least one of a dielectric material formed between the first metal layer 210 and the second metal layer 220.

The TE may further include an insulation layer 225 contacting the second metal layer 220.

The TE further includes an insulation layer 233 formed between the first metal layer 210 and the second metal layer 220, and the insulation layer 233 may include ferrite material. Accordingly, phase adjustment is made possible.

The TE may include first to third dielectric materials 232, 234, 236 disposed between the first metal layer 210 and the second metal layer 220.

Meanwhile, the TE may further include a first insulation layer 233 disposed between the first dielectric material 232 and the second dielectric material 234 and a metal layer 235 disposed between the second dielectric material 234 and the third dielectric material 236.

Meanwhile, it is preferable that a sum of heights (hb) of the first to the third dielectric materials is larger than the height of the first metal layer (ha) or the height of the second metal layer (hc).

Figure 3A:
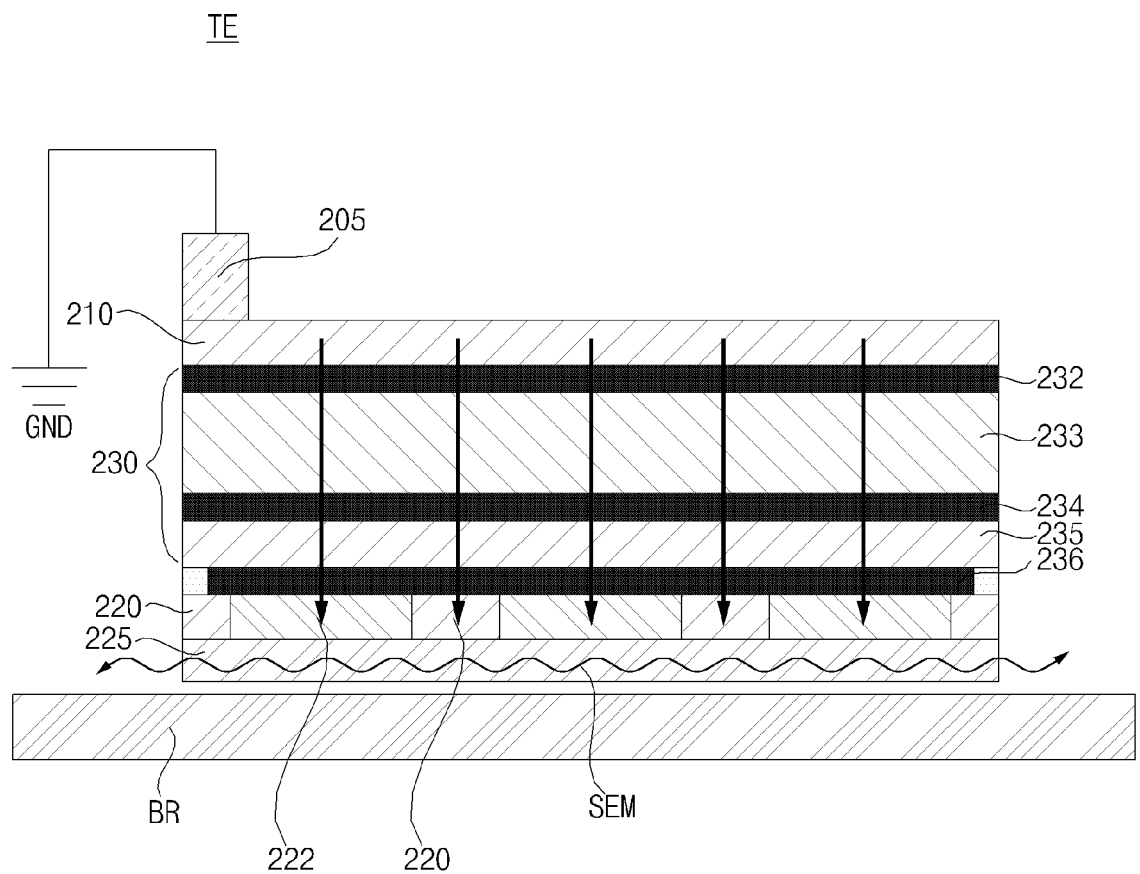

FIG. 3a illustrates a situation in which electromagnetic waves, particularly the surface EM waves, in a direction from the first metal layer 210 to the second metal layer 220, are output toward the bridge metal plate BR based on a signal applied to the signal input terminal 205.

Figure 3B:
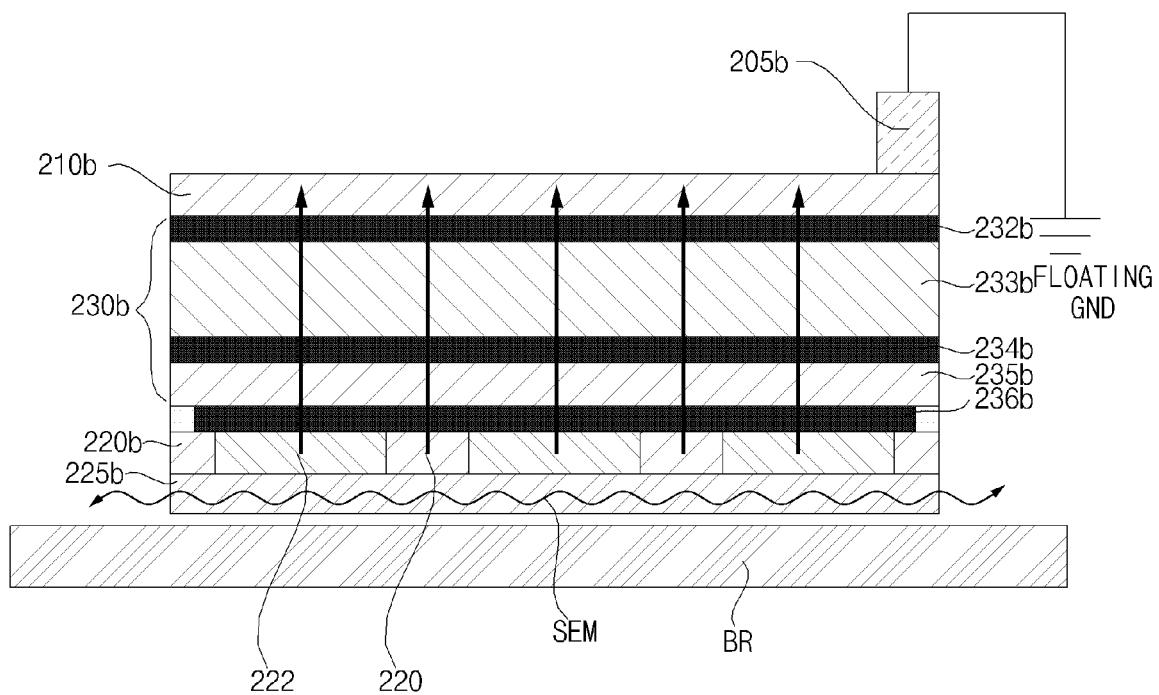

Next, FIG. 3b illustrates a situation in which electromagnetic waves from the bridge metal plate BR, particularly surface EM waves, are propagated in a direction from the fourth metal layer 220b to the third metal layer 210b.

Meanwhile, according to FIG. 3b, the RE includes fourth to sixth dielectric materials 232b, 234b, 236b disposed between the third metal layer 210b and the fourth metal layer 220b.

Meanwhile, the RE further includes a second insulation layer 233b disposed between the fourth dielectric material 232b and the fifth dielectric material 234b and a metal layer 235b disposed between the fifth dielectric material 234b and the sixth dielectric material 236b.

Figure 4:
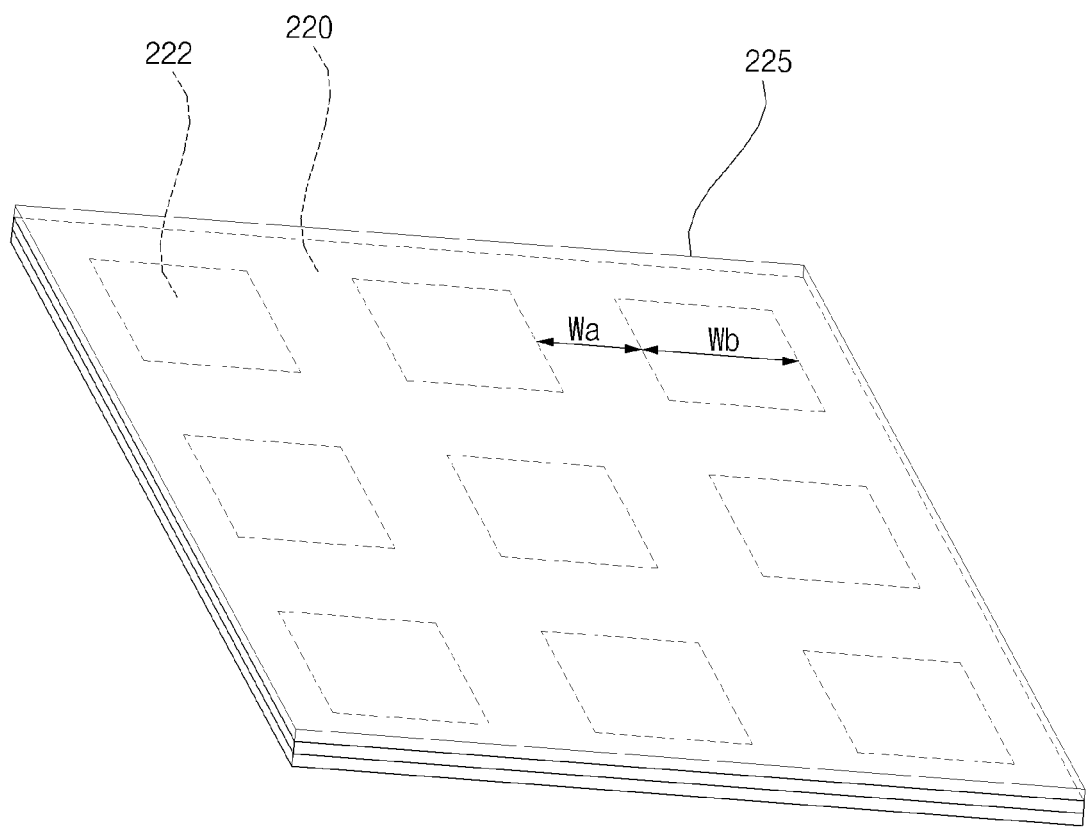

Next, FIG. 4 illustrates the second metal layer 220 in which a plurality of patterns 222 are formed and the insulation layer 225.

To generate surface EM waves, it is preferable that the spacing Wa between the plurality of patterns 222 within the second metal layer 220 is smaller than the width Wb of the patterns 222.

Figure 5A:
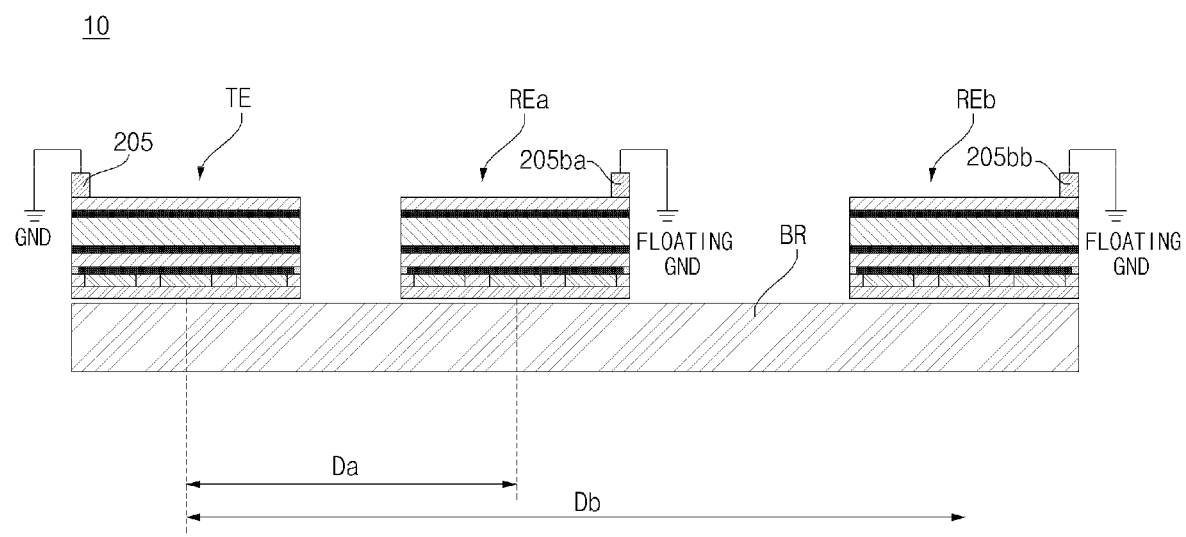
Figure 5B:
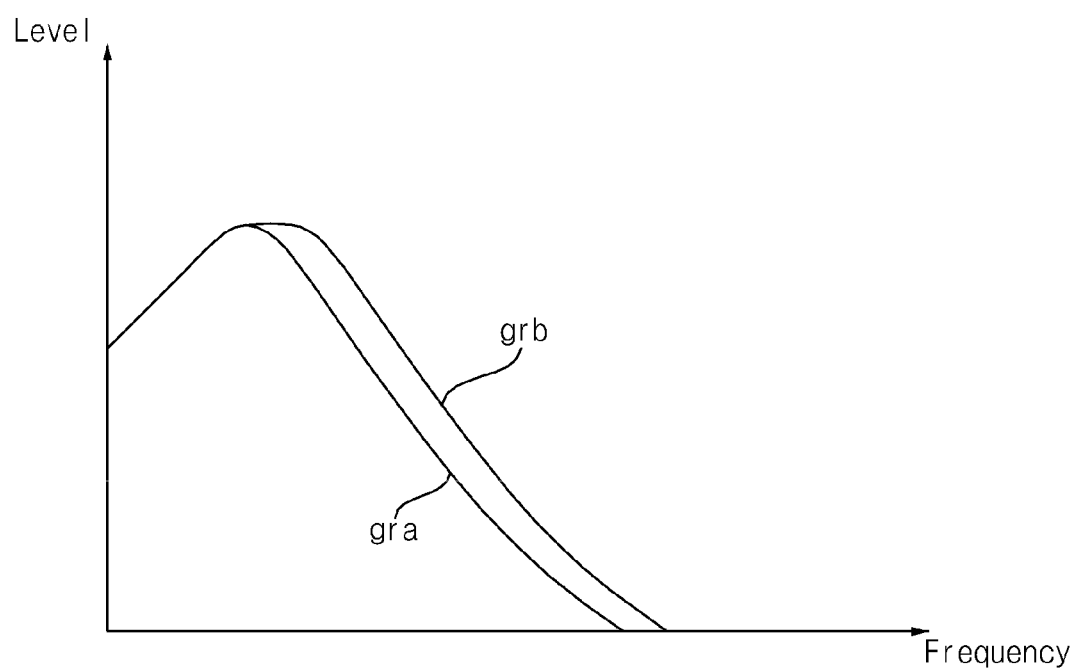

FIGS. 5a and 5b illustrate performance comparison according to the distance between the TE and the RE.

Referring to FIG. 5a, a first surface EM wave receiver (REa) is disposed at a first distance (Da) from the TE and a second surface EM wave receiver (REb) is disposed at a second distance (Db) from the TE.

In FIG. 5b, the first graph (gra) of FIG. 5b shows the performance of REa, and the second graph (grb) shows the performance of REb.

The first graph (gra) and the second graph (grb) show that there is little difference in the level along the frequency axis; however, performance deteriorates after a specific frequency. After about 15 MHz, the performance may be degraded.

Figure 6:
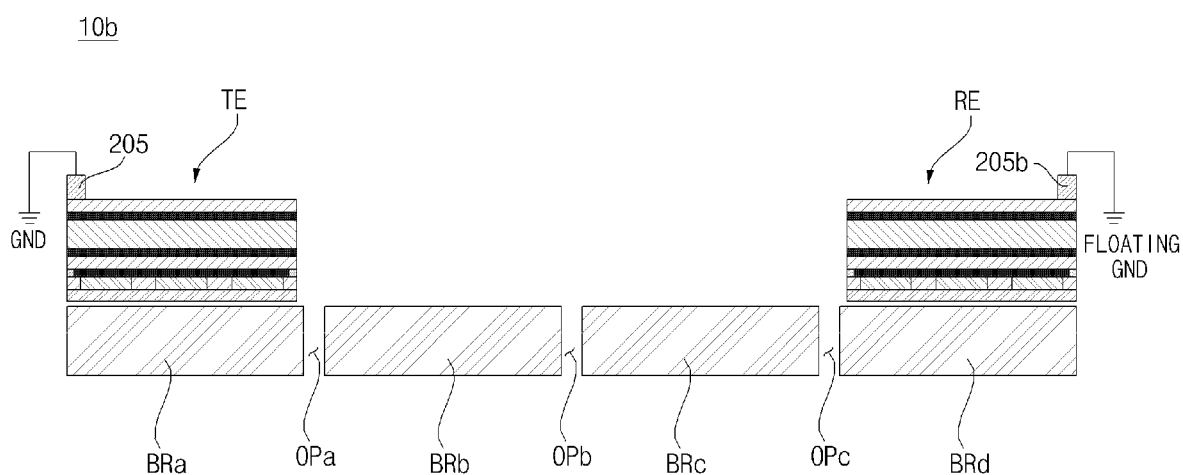
FIG. 6 illustrates a wireless power transceiver according to another embodiment of the present disclosure.

FIG. 6 illustrates a wireless power transceiver according to another embodiment of the present disclosure.

The wireless power transmitter 10b of FIG. 6 is similar to the wireless power transmitter 10 of FIG. 1, but the bridge metal plate BR does not connect the TE and the RE continuously, having a plurality of gaps (OPa, OPb, OPc).

In other words, even if a plurality of bridge metal plates (BRa-BRd) are used, wireless power transmission using surface EM waves is not affected significantly.

Figure 7:
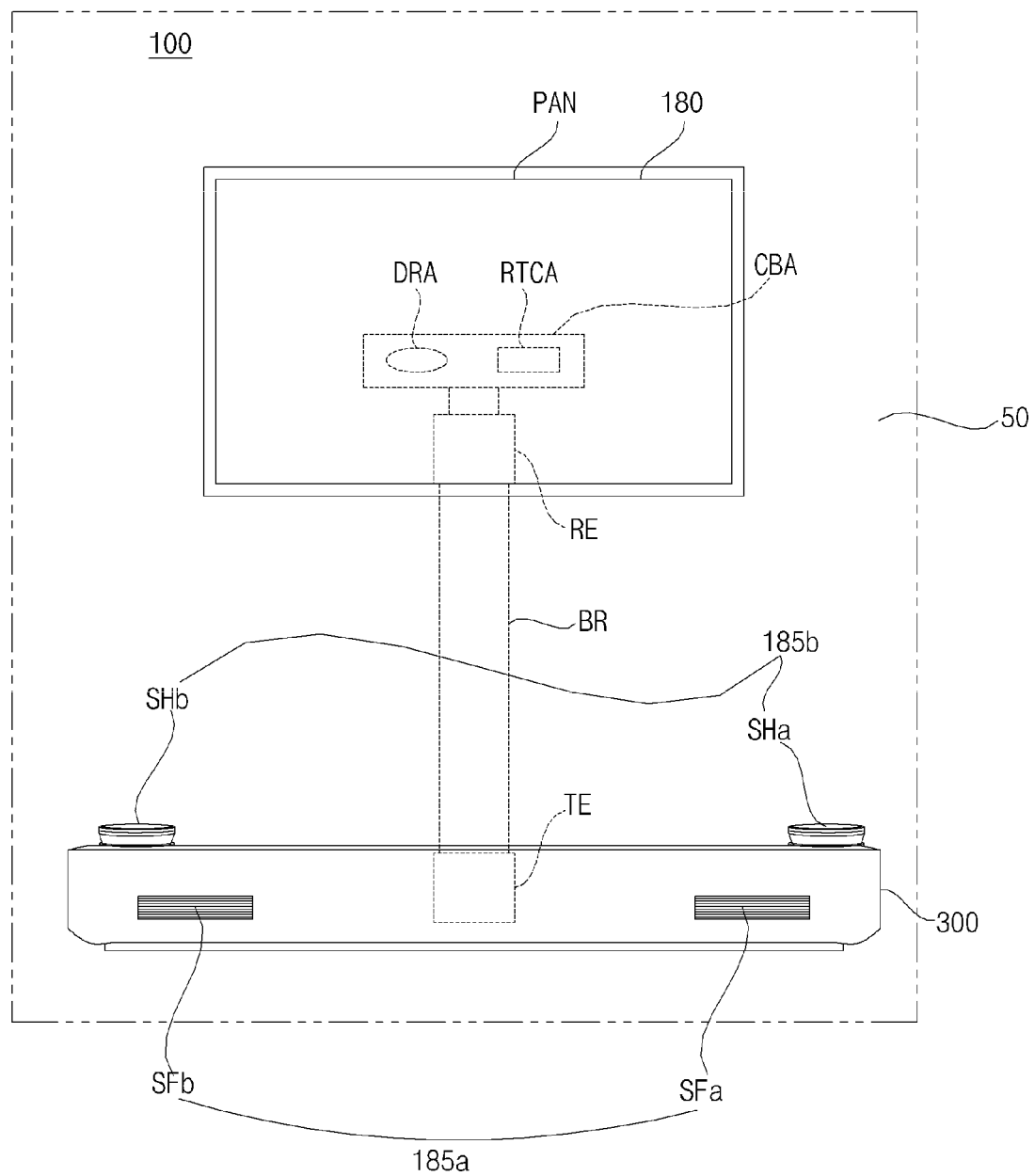
FIG. 7 illustrates an image display apparatus according to an embodiment of the present disclosure.
Figure 8:
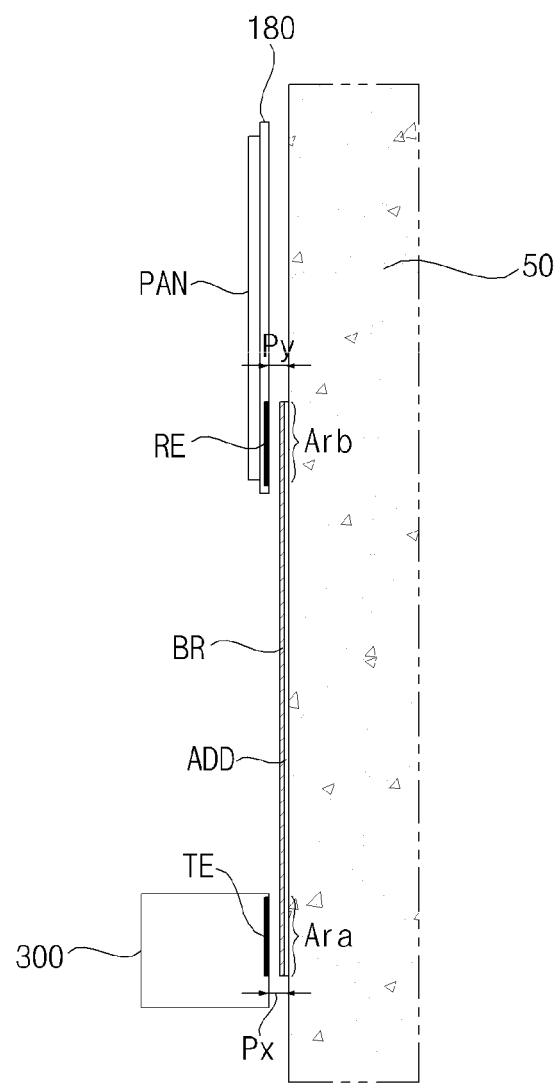
FIG. 8 is a side view of FIG. 7.

FIG. 7 illustrates an image display apparatus according to an embodiment of the present disclosure, and FIG. 8 is a side view of FIG. 7.

Referring to the figures, an image display apparatus 100 according to an embodiment of the present disclosure comprises a display 180 having a surface EM wave receiver RE for receiving wireless power; a signal processor 300 separated from the display 180 and equipped with a surface EM wave transmitter TE for transmitting wireless power to the display 180; and a bridge metal plate BR, one end of which is apart from and faces the RE and the other end of which is apart from and faces the TE.

According to the figure, a cable for power connection is not disposed between the display 180 and the signal processor 300; rather, wireless power transmission is performed using the bridge metal plate BR.

Particularly, as shown in FIG. 8, the bridge metal plate BR is separated from the surface EM wave receiver RE by a gap Py and separated from the surface EM wave transmitter TE by a gap Px.

According to the description above, wireless power transmission may be performed by using the TE, the BR, and the RE through surface EM wave propagation. This kind of power transmission method may be referred to as a surface EM wave transmission method.

Meanwhile, according to FIG. 8, the image display apparatus 100 may include an attachment member ADD on which the bridge metal plate BR is disposed.

As shown in FIG. 8, the attachment member ADD may be attached onto a wall 50 behind the display 180 and the signal processor 300. Thus, a user may simply attach the attachment member ADD having the bridge metal plate BR disposed thereon to the wall 50.

Particularly, the attachment member ADD may be wound into a roll. Accordingly, the attachment member ADD may be attached easily onto the wall 50.

Meanwhile, the display 180 may include a display circuit board CBA and a panel PAN.

The display circuit board CBA may include a power reception circuit RTCA converting wireless power received through the surface EM wave receiver RE into DC power and outputting the DC power; and a driving circuit DRA outputting a signal for image display to the panel PAN by using the DC power from the power reception circuit RTCA.

Figure 10:
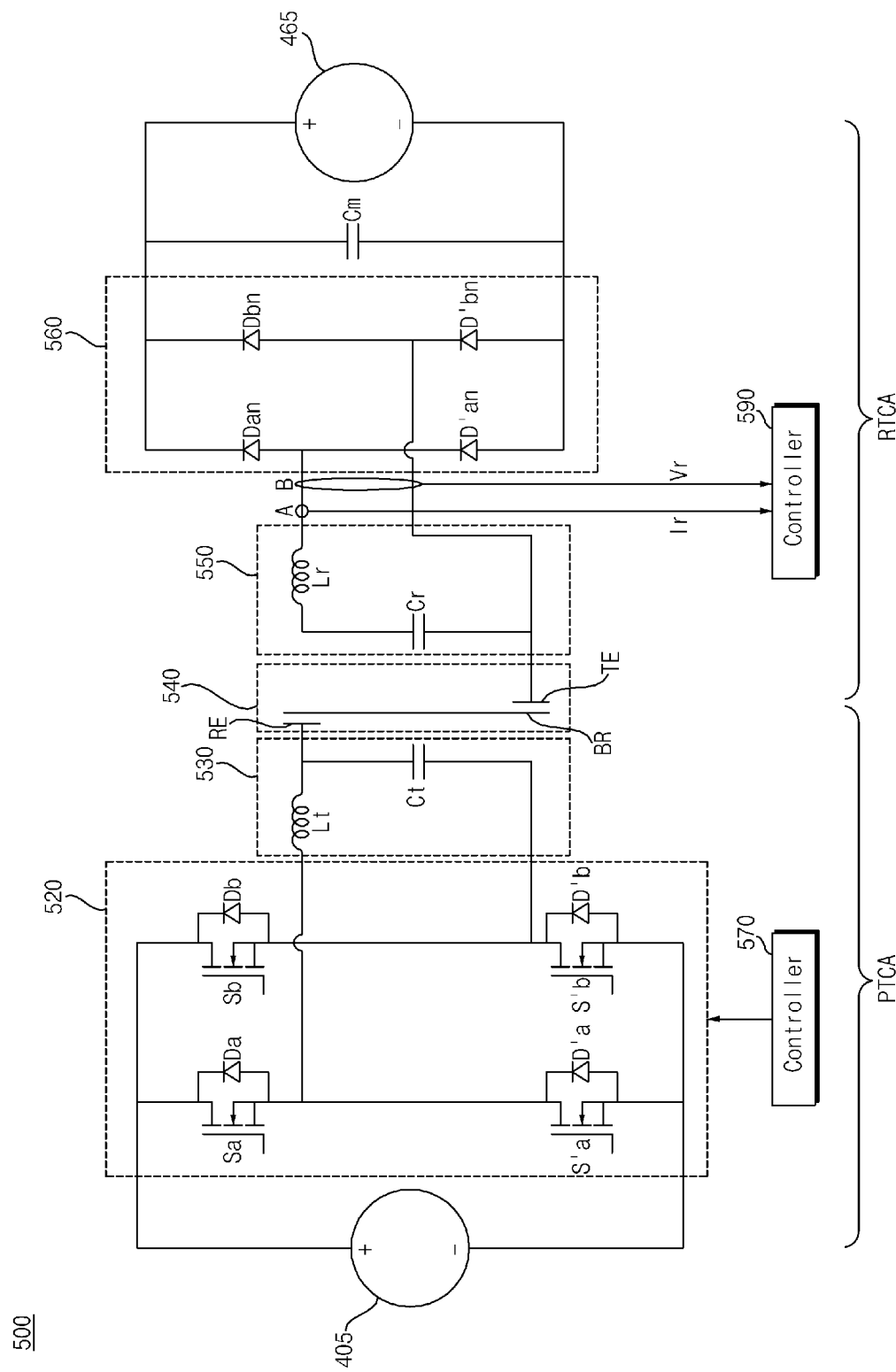
FIG. 10 is a circuit diagram illustrating one example of a wireless power circuit according to an embodiment of the present disclosure.

Meanwhile, the power reception circuit RTCA may be the power reception circuit of FIG. 10.

The driving circuit DRA may include a timing controller for outputting a drive signal to drive the panel PAN, a scan driver for driving the panel PAN based on the driver signal, and a data driver.

The panel PAN may be any of an Organic Light Emitting Diode (OLED) panel, a Liquid Crystal Display (LCD) panel, and a Light Emitting Diode (LED) panel.

The signal processor 300 may perform a signal process on an image received from the outside or an image stored in an internal memory, and transmit the signal-processed video signal wirelessly to the display 180.

The video signal may be transmitted wirelessly in a different manner from wireless power transfer. For example, the video signal may be transmitted wirelessly at a higher frequency than in wireless power transfer. Specifically, the video signal may be transmitted wirelessly by Wireless Gigabit Alliance (WiGig), Wireless Display (WiDi), or Miracast at about 60 GHz, or by Wireless Fidelity Direct (WiFi Direct).

The signal processor 300 may include a circuit board CBB for transmitting wireless power to the display 180.

The circuit board CBB may include a signal processing circuit SRA for performing a signal process on a video signal, and a power transmission circuit PTCA for wireless power transmission.

Meanwhile, the power transmission circuit PTCA may be a power transmission circuit of FIG. 10.

The signal processor 300 may process an audio signal, and output a sound in synchronization with an image displayed on the display 180.

For example, the signal processor 300 may include a first speaker 185*a* for outputting a first sound in a front direction, and a second speaker 185*b* for outputting a second sound in a direction to a ceiling 500.

In FIG. 1, speakers SFa and SFb of the first speaker 185*a* are arranged on the front of the signal processor 300, and array speakers SHa and SHb of the second speaker 185*b* are arranged on the top of the signal processor 300, by way of example.

Therefore, the first sound from the first speaker 185*a* is directed toward a user, and the second sound from the second speaker 185*b* is directed to the ceiling 500, is reflected from the ceiling 500, and then reaches the user.

Preferably, the first sound and the second sound are output in different directions, causing no acoustic interference.

Particularly, to enhance the directionality of the second sound, the second speaker 185*b* may include the array speaker SHa and SHb with a plurality of speakers.

Meanwhile, an array speaker exhibits an excellent directionality relative to a general speaker. Accordingly, the use of the array speaker SHa and SHb may lead to reduction of acoustic interference between the first sound in the front direction and the second sound in the direction to the ceiling 500.

FIGS. 9*a* to 9*d* illustrate various shapes of the bridge metal plate of FIG. 7.

Figure 9A:
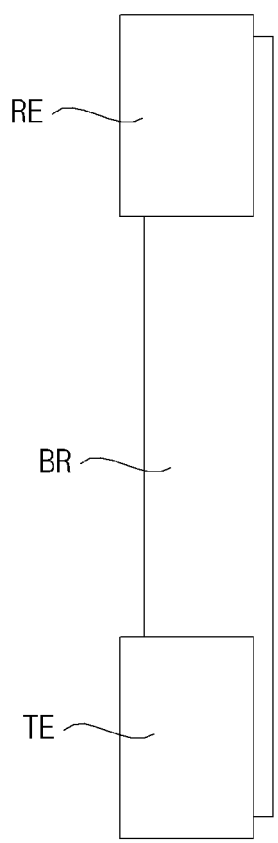
FIGS. 9a to 9d illustrate various shapes of the bridge metal plate of FIG. 7.

First, FIG. 9*a* illustrates that the width of the bridge metal plate BR is constant.

Particularly, the figure illustrates that the bridge metal plate BR is disposed to be separated by a predetermined distance from the surface EM wave receiver RE disposed in the display 180 and disposed to be separated by a predetermined distance from the surface EM wave transmitter TE within the signal processor 300 disposed in the lower part of the display 180.

Figure 9B:
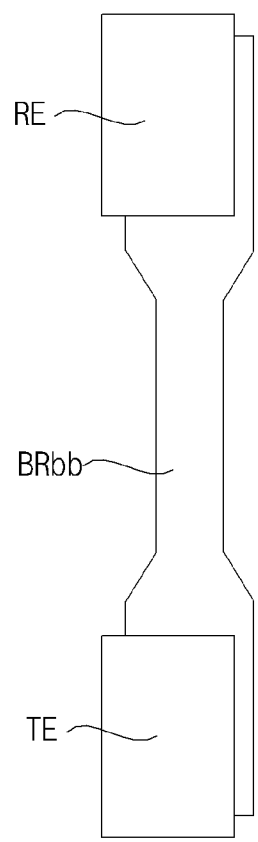
Figure 9C:
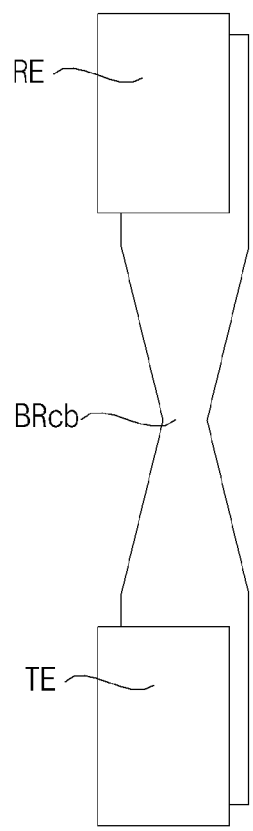
Figure 9D:
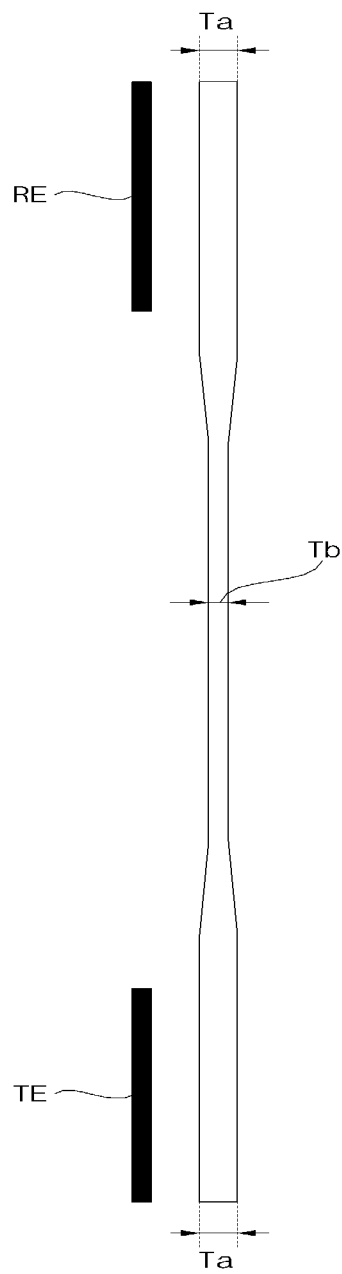

Meanwhile, to perform wireless power transmission efficiently and at the same time, to achieve the aesthetic effect from a colored bridge metal plate BR, it is possible to change the shape of the bridge metal plate BR in various ways as shown in FIGS. 9*b* to 9*d*.

First, FIG. 9*b* illustrates a case in which both ends of the bridge metal plate BR are wider than the central part of the bridge metal plate BR.

In other words, widths of one end facing the surface EM wave receiver RE and the other end facing the surface EM wave transmitter TE may be wider than the width of the central part of the bridge metal plate BR.

According to the shape above, the width of the central part of the bridge metal plate BR may be reduced down to a level at which internal pressure due to a flowing current or voltage may still be resisted. Meanwhile, if the width of the central part of the bridge metal plate BR is smaller, a user may not recognize the bridge metal plate BR easily, which may increase the aesthetic effect.

Next, FIG. 9*c* illustrates a case in which the width of the bridge metal plate BR is increased linearly toward both ends.

In other words, the width is smallest at the central part of the bridge metal plate BR, and the width increases linearly toward either end of the bridge metal plate BR.

In a different expression, the width of the bridge metal plate BR is decreased linearly toward the central part. Accordingly, similar to the effect illustrated in FIG. 9*b*, the bridge metal plate BR may not be recognized easily, which may increase the aesthetic effect.

Meanwhile, FIG. 9*d* illustrates a case in which the thickness Tb of the central part of the bridge metal plate BR is larger than the thickness Tb at both ends of the bridge metal plate BR.

According to the above description, wireless power transmission may be performed efficiently through the bridge metal plate BR.

Meanwhile, differently from the illustration of FIG. 9*d*, it is also possible that thickness is increased linearly toward both ends of the bridge metal plate BR.

In other words, it is possible that thickness is smallest at the central part of the bridge metal plate BR and increases toward both ends of the bridge metal plate BR.

In a different expression, thickness may be decreased toward the central part of the bridge metal plate BR. Accordingly, wireless power transmission may be performed efficiently through the bridge metal plate BR.

Meanwhile, the bridge metal plate BR may include a transparent metal such as ITO so that it may be transparent.

FIG. 10 is a circuit diagram illustrating one example of a wireless power circuit according to an embodiment of the present disclosure.

Referring to the figure, the wireless power circuit 500 of FIG. 10 may comprise a power transmission circuit PTCA for wireless power transmission within the signal processor 300, a power reception circuit RTCA within the display 180, and a bridge metal plate BR.

The power transmission circuit PTCA may include an inverter 520 having a plurality of switching elements Sa, Sb, S'a, and S'b, to convert DC power to AC power, a first resonator 530 for resonating with the AC power received from the inverter 520, and an inverter controller 570 for controlling the inverter 520.

The inverter 520 may include the plurality of switching elements Sa, S'a, Sb, and S'b, and may convert DC power 405 to AC power of a predetermined frequency according to on/off of the switching elements Sa, S'a, Sb, and S'b, and output the AC power.

In the inverter 520, a pair of upper-arm switching elements Sa and Sb are connected serially, a pair of lower-arm switching elements S'a and S'b are connected serially, and two pairs of upper-arm and lower-arm switching elements Sa & S'a and Sb & S'b are connected in parallel. Anti-parallel diode elements Da, D'a, Db, and D'b are connected in reverse parallel to the respective switching elements Sa, S'a, Sb, and S'b.

Each of the switching elements of the inverter 520 is turned on/off based on an inverter switching control signal Sic received from the inverter controller 570.

The power transmission circuit PTCA may further include an output voltage detector to detect an output voltage of the inverter 520, or an output current detector to detect an out current of the inverter 520.

The inverter controller 570 may generate and output the inverter switching control signal Sic for controlling on/off of each switching element based on a voltage or current output from the output voltage detector or the output current detector.

The inverter 520 may also be referred to as a full bridge switching unit.

The first resonator 530 may be disposed at the output end of the inverter 520, and include an inductor Lt and a capacitor Ct.

The first resonator 530 may resonate by means of the inductor Lt and the capacitor Ct, and thus transmit wireless power by resonance.

A surface EM wave transmitter TE may be connected electrically to the output of the first resonator 530.

Also, a bridge metal plate BR may be disposed, the other end of which is apart from and faces the TE.

Meanwhile, the display 180 may include a surface EM wave receiver RE which is apart from and faces one end of the bridge metal plate BR.

Meanwhile, the surface EM wave transmitter TE within the signal processor 300, the surface EM wave receiver RE within the display 180, and the bridge metal plate BR may be referred to collectively as a wireless power transceiver 540.

As described above, the wireless power transceiver 540 may perform surface EM wave power transmission by using the metal plate.

The power reception circuit RTCA of the display 180 may include a second resonator 550 for resonating with AC power received from the first and second electrodes REa and REb, and a rectifier 560 having a plurality of diode elements Dan, Dbn, D'an, D'bn, for rectifying the AC power received from the second resonator 550.

The second resonator 550 resonates by means of an inductor Lr and a capacitor Cr, thereby enabling wireless power transfer.

Particularly, the second resonator 550 resonates with wireless power received from the surface EM wave receiver RE through the inductor Lr and the capacitor Cr, by which AC power may be outputted to the rectifier 560.

The power reception circuit RTCA of the display 180 may further include a current detector A for detecting the current of the received AC power, or a voltage detector B for detecting the voltage of the received AC power.

The rectifier 560 includes the plurality of diode elements Dan, Dbn, D'an, D'bn and may rectify the received AC power. Particularly, the rectifier 560 may convert the received AC power to DC power and output the DC power.

In the rectifier 560, a pair of upper-arm diode elements Dan and Dbn are connected serially, a pair of lower-arm diode elements D'an and D'bn are connected serially, and two pairs of upper-arm and lower-arm diode elements Dan & D'an and Dbn & D'bn are connected in parallel.

The power reception circuit RTCA of the display 180 may include a rectification controller 590 for calculating received wireless power based on an input current or input voltage received from the current detector A or the voltage detector B.

For example, if the power calculated based on the detected current or voltage is equal to or less than a predetermined first value, the rectification controller 590 may control transmission of received power information to the signal processor 300.

In another example, when required power is equal to or greater than a predetermined second value, the rectification controller 590 may control transmission of required power information to the signal processor 300.

The power reception circuit RTCA of the display 180 may further include a capacitor Cm for storing rectified DC power received from the rectifier 560. The driving circuit DRA and the panel PAN of the display 180 operate based on the rectified DC power.

The wireless power transceiver and the image display apparatus according to the foregoing exemplary embodiments are not limited to the exemplary embodiments set forth herein. Therefore, all or part of the embodiments set forth herein may be selectively combined and integrated so as to implement various modifications of the embodiments described above.

Throughout the document, preferred embodiments of the present disclosure have been described with reference to appended drawings; however, the present disclosure is not limited to the descriptions given above. Rather, it should be noted that various modifications of the present disclosure may be made by those skilled in the art to which the present disclosure belongs without departing from scope of the present disclosure defined by the appended claims, and these modifications should not be understood individually from the technical principles or perspectives of the present disclosure.

What is claimed is:

1. A wireless power transceiver comprising:
a surface electromagnetic (EM) wave transmitter including a first metal layer connected electrically to a signal input terminal, a second metal layer apart from the first metal layer, and at least one dielectric material formed between the first metal layer and the second metal layer;
a surface EM wave receiver including a third metal layer connected electrically to a signal output terminal, a fourth metal layer in which a plurality of patterns are formed, and at least one dielectric material formed between the third metal layer and the fourth metal layer; and
a bridge metal plate disposed between the surface EM wave transmitter and the surface EM wave receiver,
wherein the bridge metal plate is apart from the surface EM wave transmitter, and a surface EM wave from the surface EM wave transmitter is transmitted through the bridge metal plate,
wherein one end of the signal output terminal is connected to a floating ground, and
wherein a thickness or a width at both ends of the bridge metal plate is larger than that of a central part of the bridge metal plate.

2. The wireless power transceiver of claim 1, wherein one end of the signal input terminal is connected to the ground.

3. The wireless power transceiver of claim 1, wherein the surface EM wave transmitter further includes an insulation layer contacting the second metal layer.

4. The wireless power transceiver of claim 3, wherein a sum of heights of the first to the third dielectric materials is larger than the height of the first metal layer or the height of the second metal layer.

5. The wireless power transceiver of claim 1, wherein the surface EM wave transmitter further includes an insulation layer formed between the first metal layer and the second metal layer, and the insulation layer includes ferrite material.

6. The wireless power transceiver of claim 1, wherein the surface EM wave transmitter includes first to third dielectric materials disposed between the first metal layer and the second metal layer, and
wherein the surface EM wave transmitter further includes a first insulation layer disposed between the first dielectric material and the second dielectric material and a metal layer disposed between the second dielectric material and the third dielectric material.

7. The wireless power transceiver of claim 1, wherein the spacing of patterns formed within the second metal layer is smaller than a width of the patterns.

8. The wireless power transceiver of claim 1, wherein, based on a signal applied to the signal input terminal, electromagnetic waves are output in a direction from the first metal layer to the second metal layer.

9. The wireless power transceiver of claim 1, wherein the surface EM wave receiver includes fourth to sixth dielectric materials disposed between the third metal layer and the fourth metal layer, and
wherein the surface EM wave receiver further includes a second insulation layer disposed between the fourth dielectric material and the fifth dielectric material and a metal layer disposed between the fifth dielectric material and the sixth dielectric material.

10. The wireless power transceiver of claim 1, wherein the width at both ends of the bridge metal plate is wider than that of the central part of the bridge metal plate.

11. The wireless power transceiver of claim 1, wherein the width increases toward the both ends of the bridge metal plate.

12. A wireless power transceiver comprising:
a surface EM wave transmitter including a first metal layer connected electrically to a signal input terminal, a second metal layer apart from the first metal layer, and at least one dielectric material formed between the first metal layer and the second metal layer;
a surface EM wave receiver including a third metal layer connected electrically to a signal output terminal, a fourth metal layer in which a plurality of patterns are formed, and at least one dielectric material formed between the third metal layer and the fourth metal layer; and
a bridge metal plate disposed between the surface EM wave transmitter and the surface EM wave receiver,
wherein the bridge metal plate is apart from the surface EM wave transmitter, and a surface EM wave from the surface EM wave transmitter is transmitted through the bridge metal plate,
wherein the surface EM wave transmitter further includes an insulation layer formed between the first metal layer and the second metal layer, and the insulation layer includes ferrite material, and
wherein a thickness or a width at both ends of the bridge metal plate is larger than that of a central part of the bridge metal plate.

13. An image display apparatus comprising:
a wireless power transceiver,
wherein the wireless power transceiver comprises:
a surface EM wave transmitter including a first metal layer connected electrically to a signal input terminal, a second metal layer apart from the first metal layer, and at least one dielectric material formed between the first metal layer and the second metal layer;
a surface EM wave receiver including a third metal layer connected electrically to a signal output terminal, a fourth metal layer in which a plurality of patterns are formed, and at least one dielectric material formed between the third metal layer and the fourth metal layer; and
a bridge metal plate disposed between the surface EM wave transmitter and the surface EM wave receiver,
wherein the bridge metal plate is apart from the surface EM wave transmitter and a surface EM wave from the surface EM wave transmitter is transmitted through the bridge metal plate,
wherein one end of the signal output terminal is connected to a floating ground, and
wherein a thickness or a width at both ends of the bridge metal plate is larger than that of a central part of the bridge metal plate.

14. The image display apparatus of claim 13, further comprising:
a display; and
a signal processor separated from the display and to perform wireless power transmission to the display,
wherein the surface EM wave transmitter of the wireless power transceiver is disposed in the signal processor, and
wherein the surface EM wave receiver of the wireless power transceiver is disposed in the display.

15. The image display apparatus of claim 13, wherein the surface EM wave transmitter further includes an insulation layer formed between the first metal layer and the second metal layer, and the insulation layer includes ferrite material.

16. The image display apparatus of claim 13, wherein the surface EM wave transmitter includes first to third dielectric materials disposed between the first metal layer and the second metal layer, and
wherein the surface EM wave transmitter further includes a first insulation layer disposed between the first dielectric material and the second dielectric material and a metal layer disposed between the second dielectric material and the third dielectric material.

17. The image display apparatus of claim 13, wherein the surface EM wave transmitter further includes an insulation layer contacting the second metal layer, and
a sum of heights of the first to the third dielectric materials is larger than the height of the first metal layer or the height of the second metal layer.

18. The image display apparatus of claim 13, wherein the surface EM wave receiver includes fourth to sixth dielectric materials disposed between the third metal layer and the fourth metal layer, and
wherein the surface EM wave receiver further includes a second insulation layer disposed between the fourth dielectric material and the fifth dielectric material and a metal layer disposed between the fifth dielectric material and the sixth dielectric material.

* * * * *